US010778699B1

(12) United States Patent
Bradley et al.

(10) Patent No.: US 10,778,699 B1
(45) Date of Patent: Sep. 15, 2020

(54) NETWORK ATTACK MITIGATION BASED ON DISTRIBUTED PACKET ANALYSIS

(71) Applicant: Verizon Digital Media Services Inc., Dulles, VA (US)

(72) Inventors: Christopher Bradley, Walnut Creek, CA (US); Jayson G. Sakata, Los Angeles, CA (US)

(73) Assignee: Verizon Digital Media Services Inc., Dulles, VA (US)

( * ) Notice: Subject to any disclaimer, the term of this patent is extended or adjusted under 35 U.S.C. 154(b) by 388 days.

(21) Appl. No.: 15/489,466

(22) Filed: Apr. 17, 2017

(51) Int. Cl.
*H04L 29/06* (2006.01)

(52) U.S. Cl.
CPC ...... *H04L 63/1416* (2013.01); *H04L 63/1441* (2013.01)

(58) Field of Classification Search
CPC .................. H04L 63/1416; H04L 63/1441
USPC ......................................................... 726/23
See application file for complete search history.

(56) References Cited

U.S. PATENT DOCUMENTS

| | | | | |
|---|---|---|---|---|
| 8,112,801 B2* | 2/2012 | Abdel-Aziz | .......... | H04L 63/145 713/160 |
| 8,418,249 B1* | 4/2013 | Nucci | .......... | G06F 21/552 706/20 |
| 2003/0154399 A1* | 8/2003 | Zuk | .......... | H04L 63/0254 726/11 |
| 2007/0280114 A1* | 12/2007 | Chao | .......... | H04L 43/0888 370/235.1 |
| 2008/0134331 A1* | 6/2008 | Sung Won | .......... | G06F 21/552 726/22 |
| 2010/0050256 A1* | 2/2010 | Knapp | .......... | H04L 69/161 726/22 |
| 2010/0153316 A1* | 6/2010 | Duffield | .......... | G06F 21/552 706/12 |
| 2014/0289840 A1* | 9/2014 | Jain | .......... | H04L 63/0245 726/13 |
| 2015/0326594 A1* | 11/2015 | Chari | .......... | H04L 63/1425 726/23 |

OTHER PUBLICATIONS

Garg et al., hereinafter ("Garg"), PHAD: Packet header anomaly detection, Jan. 7, 2016, IEEE Xplore, 2016 10th International Conference on Intelligent Systems and Control (ISCO), pp. 1-5 (Year: 2016).*

* cited by examiner

*Primary Examiner* — Ali Shayanfar
*Assistant Examiner* — Sakinah White Taylor
(74) *Attorney, Agent, or Firm* — Ansari Katiraei LLP; Arman Katiraei; Sadiq Ansari

(57) ABSTRACT

Localized and global detection and mitigation of network attacks in a distributed platform are provided. The localized detection identifies attacks occurring at individual nodes of the distributed platform based on packet analysis conducted by each individual node. The global detection identifies attacks occurring across the distributed platform based on packet analysis conducted on traffic aggregated from across the distributed platform. Either detection involves inspecting headers of the sampled packets. Each header property is scored based on an amount of deviation from threshold values. The sum of scores identifies the header properties that form an attack signature. Attack protections are implemented against subsequently arriving packets with header properties matching the attack signature.

16 Claims, 9 Drawing Sheets

NETWORK ATTACK MITIGATION BASED ON DISTRIBUTED PACKET ANALYSIS

BACKGROUND ART

Network security is an increasingly difficult challenge. Distributed denial of service (DDoS) and other network based attacks continue to grow in size and sophistication. In particular, the number of compromised devices that form the botnet launching the attack and the attack logic used in mitigating attack counter-measures have made these attacks more virulent. It is no longer feasible to simply absorb attacks or wait them out.

Absorbing attacks involved creating a large enough distribution platform with resources sufficient to respond to valid traffic as well as invalid attack traffic. In other words, absorption involved providing enough capacity or supply to exceed the extra load or demand created during an attack.

Content delivery network (CDNs) provide such a large distributed platform. CDNs operate multiple points-of-presence (PoPs) in different regions. Each PoP has multiple servers that respond to client requests and serve requested content on behalf of different content providers in return.

Even with a vast deployment of PoPs and servers, botnet size has increased past the point of the CDN being able to simply absorb the amount of traffic coming from the botnet. In other words, a botnet is no longer some small set of devices that can be easily detected as sending illegitimate traffic. Botnets are large enough and involve so many different devices that it is extremely difficult to differentiate the attack traffic from actual user valid traffic.

Accordingly, there is a need for robust network attack detection and mitigation. With respect to attack detection, there is a need to quick identify signatures of an attack localized on a specific region or PoP before that attack compromises performance in that region and before that attack spreads to other regions or PoPs. In other words, there is a need for localized or distributed attack detection and leveraging the detection for initiating global or platform wide attack protections in advance of the attack cascading across the platform.

There is also a need to maintain a near real-time comprehensive view of the entire distributed platform in order to detect attacks focused not on any given region but on the distributed platform as a whole. In other words, there is a need for global attack detection whereby the accumulation of attack traffic at any one PoP may not meet attack thresholds, but the aggregate amount of attack traffic received across all PoPs of the distributed platform is sufficient indicia of an attack.

In all such instances, there is further a need for rapid automated mitigation of any detected localized or distributed attack. To this end, there is a need for the distributed platform to autonomously implement counter-measures that correctly target and block the illegitimate attack traffic from wasting server resources while permitting legitimate user traffic through to the servers for a response.

BRIEF DESCRIPTION OF THE DRAWINGS

A preferred embodiment for network attack mitigation based on distributed packet analysis will now be described, by way of example only, with reference to the accompanying drawings in which.

DETAILED DESCRIPTION

Disclosed are systems and methods for localized and global detection and mitigation of network attacks in a distributed platform. The localized detection identifies attacks occurring at individual nodes of the distributed platform based on packet analysis conducted by each individual node, whereas the global detection identifies attacks occurring across the distributed platform based on packet analysis conducted on traffic aggregated from across the distributed platform. The distributed platform can be a content delivery network (CDN), a cloud service provider, or any operator of a distributed set of servers, wherein the distributed set of servers collectively function to serve content or services over a digital network in response to different client requests for those content or services, and wherein attacks launched against the distributed set of servers attempt to disrupt the serving of the content or services by overwhelming or otherwise degrading performance of the servers.

Figure 1:
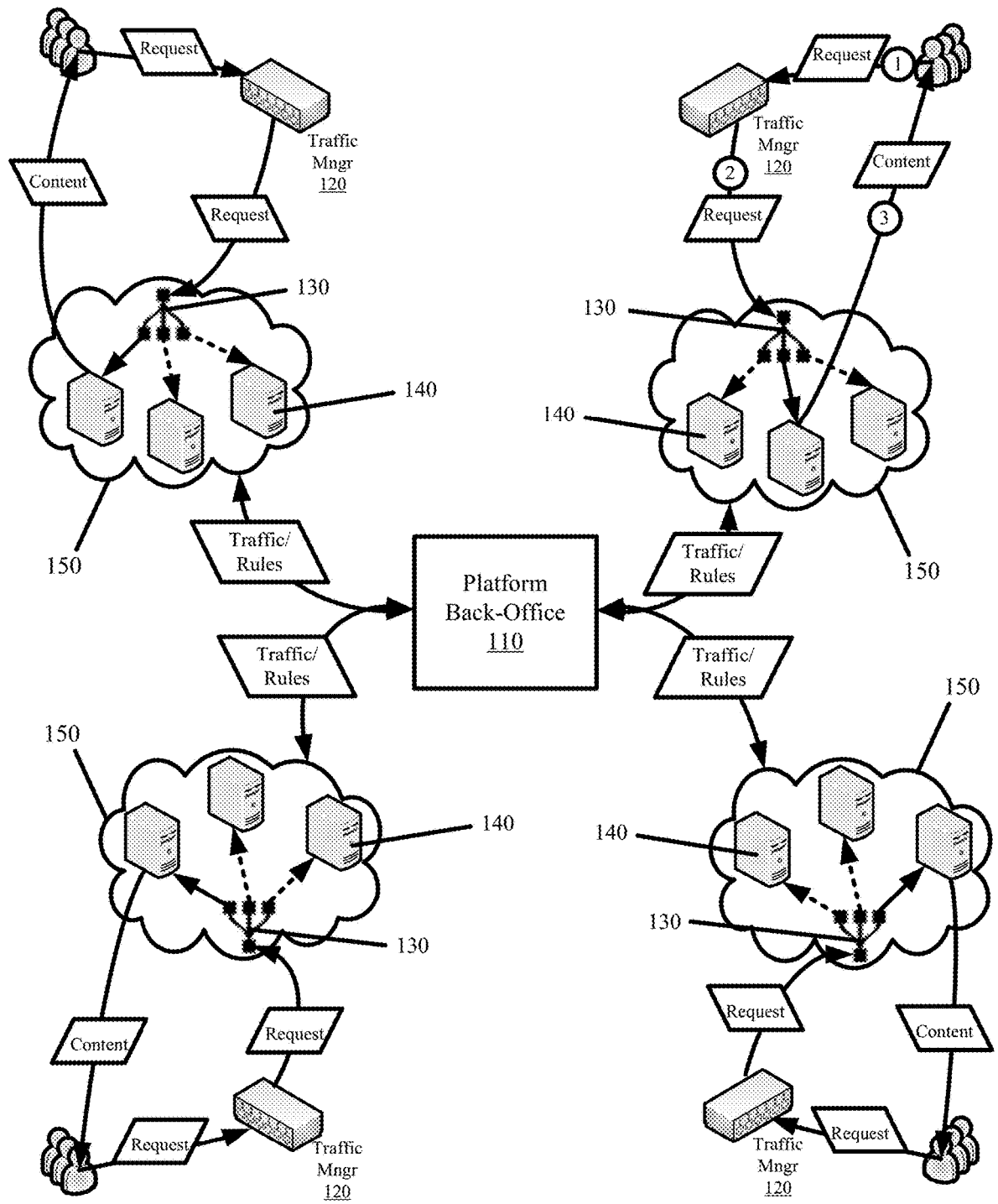
FIG. 1 illustrates an exemplary architecture of a distributed platform in accordance with some embodiments.

FIG. 1 illustrates an exemplary architecture of a distributed platform in accordance with some embodiments. The distributed platform includes nodes for performing the localized attack detection and mitigation, and a platform back-office 110 for performing the global attack detection and mitigation in concert with the distributed nodes.

The nodes for performing the localized attack detection and mitigation can include traffic management servers 120, request directors 130, and distribution servers 140. The request directors 130 and distribution servers 140 form different points-of-presence (PoPs) 150. The PoPs 150 are distributed across different network edges of the Internet. Each PoP 150 is representative of a server farm for a geographically proximate set of physically separate servers or a set of virtual servers that execute over partitioned sets of resources of one or more physically separate servers.

The request directors 130 receive incoming connections or requests to the corresponding PoP 150 and can therefore be the subject or target of a network attack. The request directors 130 distribute those connections or requests across the distribution servers 140 of the PoP 150. The request directors 130 balance load across the distribution servers 140 based on the distribution. The distribution also enables the request directors 130 to designate different distribution servers 140 of a PoP 150 for delivery of different subsets of the content or services that are available at the PoP 150.

The distribution servers 140 can also be the subject or target of a network attack. The distribution servers 140 are the nodes that respond to the incoming requests and serve the requested content and services of one or more originators (i.e., content providers or content creators) to the requesting clients. A distribution server 140 may serve the same content as other distribution servers 140 in the same PoP 150 or may be configured to serve different content than the other distribution servers 140 in the same PoP 150.

The traffic management servers 120 route clients, and more specifically, client issued requests for content to a PoP 150 that can optimally deliver the requested content back to the clients. Optimal delivery is typically achieved with a distribution server 140 caching requested content in a PoP 150 that is geographically closest to the client that issued the content request. Different implementations utilize different traffic management schemes to achieve request routing. For example, the traffic management scheme can be conducted according to Anycast routing. However, other traffic management schemes, such as Domain Name System (DNS) routing, can alternatively be used. The traffic management servers 120 can include different combinations of DNS servers, load balancers, and routers performing Anycast, DNS, or Border Gateway Protocol (BGP) routing as some examples.

The traffic management servers 120 can also be the subject of network attacks as they provide the first point of access into the distributed platform. For instance, a botnet can flood the traffic management servers 120 with an excess number of DNS queries or other routing requests, thereby preventing the traffic management servers 120 from routing or resolving valid queries from legitimate clients, which in turn, prevents the legitimate clients from being able to access the distributed platform distribution servers 140.

The platform back-office 110 includes one or more servers performing centralized or global attack detection and mitigation. As described in greater detail below, the platform back-office 110 aggregates packet properties from the traffic management servers 120, request directors 130, distribution servers 140, or some combination thereof in order to obtain a holistic view of traffic across the distributed platform and to detect and protect against attacks dispersed across these distributed platform nodes. In some embodiments, the platform back-office 110 also performs configuration control and reporting functionality for the distributed platform. In some such embodiments, content providers register with the platform back-office 110 in order to access services and functionality of the distributed platform including specifying a configuration and uploading content to the distributed platform for distribution through the various PoPs. In some such embodiments, the platform back-office 110 also aggregates statistics data from each distribution server 140 and processes the statistics to produce usage and performance reports for the content providers.

Localized attack detection and mitigation is performed at a particular request director, distribution server, or traffic management server based on packets received by that distributed platform node. In some embodiments, local attack detection and mitigation performed by a particular request director equates to localized attack detection and mitigation for an entire PoP when the particular request director is the point of ingress for all packets arriving at the PoP. Localized attack detection and mitigation allows an individual distributed platform node to detect attacks that it is the subject or target of so that it may protect itself through unilateral ameliorative action taken by the node against those attacks.

Global attack detection and mitigation is performed at the platform back-office based on packets aggregated from one or more of the distributed set of request directors, distribution servers, or traffic management servers of the distributed platform. The aggregate set of packets provide the platform back-office with a holistic view of traffic across the distributed platform in order to detect distributed attacks on the distributed platform that may go undetected locally at each of the individual nodes.

Figure 2:
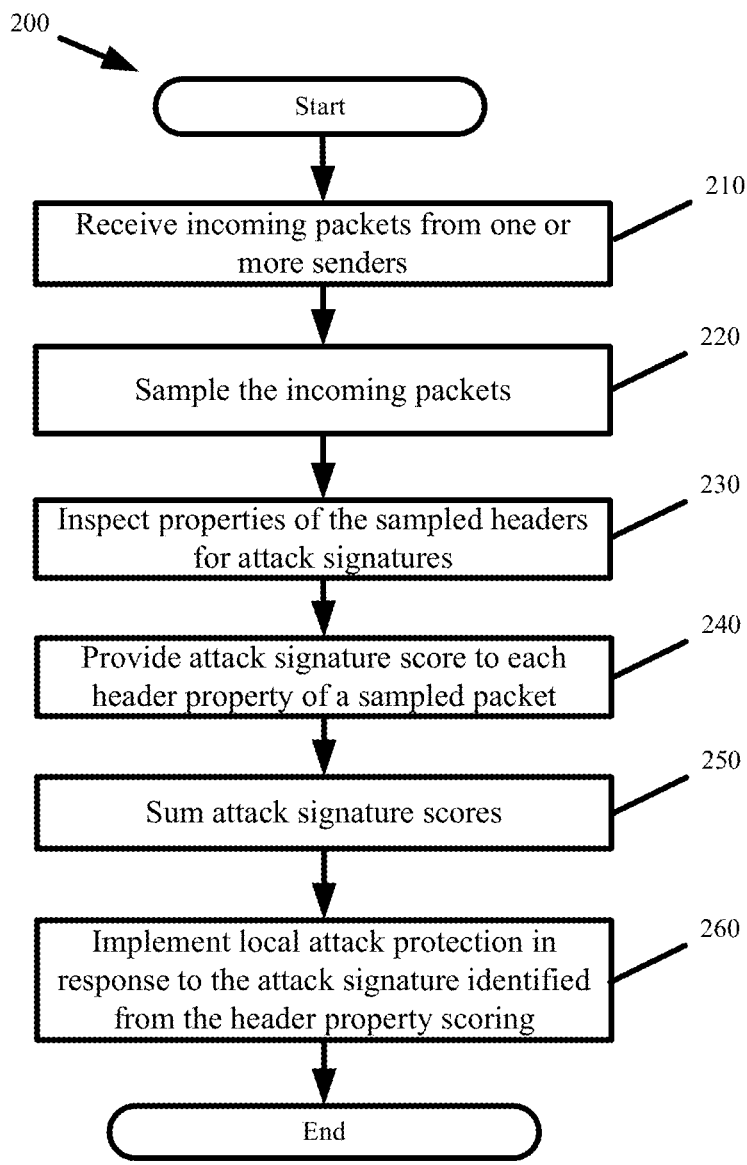
FIG. 2 presents a process for localized attack detection and mitigation in accordance with some embodiments.

FIG. 2 presents a process 200 for localized attack detection and mitigation in accordance with some embodiments. The process 200 is performed at any one of the request director, distribution server, or traffic management server nodes of the distributed platform.

The process 200 commences with the distributed platform node receiving (at 210) incoming packets from one or more senders. The incoming packets include valid user traffic from legitimate client devices as well as attack traffic from compromised devices operating independently or as part of a larger botnet. The incoming packets include DNS queries when the receiving node is a traffic management server. The incoming packets include Transmission Control Protocol (TCP) connection establishment requests or HyperText Transfer Protocol (HTTP) messages passed over TCP or User Datagram Program (UDP) when the receiving node is a request director or distribution server. Packets of other network protocols may also be received and analyzed in conjunction with process 200.

The process samples (at 220) the incoming packets as they are received. In some embodiments, the sampling includes extracting, copying, or analyzing headers from a desired set of the incoming packets without processing the payloads of the corresponding packets. Each and every packet received by the distributed platform node can be sampled. However, for overhead and efficiency reasons, the sampling is typically relegated to a fraction of the incoming packets. In some embodiments, one in every thousand packets received by the distributed platform node is sampled by that node. The sampling can be further relegated to packets directed to specific protocols, packet types, and other criteria. For instance, request directors may sample request headers of TCP SYN packets used in establishing new connections, while ignoring User Datagram Protocol (UDP) packets. The nodes could also sample one or more of the Internet Protocol (IP), TCP, UDP, HTTP, or other protocol headers from received packets.

Some embodiments sample the desired set of packets by filtering those packets directly from the node's protocol stack. Iptables and rsyslog are features of the Linux/UNIX kernel providing stack access, packet filtering, and logging of filtered packets. The headers of the sampled packets can then be indexed and stored to a datastore, wherein the indexing promotes faster inspection of the packet headers.

The process inspects (at 230) the properties of the sampled headers for attack signatures. An attack signature is a single or combination of packet header properties that are common to all packets of an attack or anomalous event. This includes packet header properties with unexpected, irregular, inconsistent, or constant values. This further includes packet header properties that deviate from an average or mean value. Some attack signatures are detected from the properties of a single packet. Other attack signatures are detected from a comparison of properties of one packet with properties of one or more other packets with some basis of commonality between the compared packets. Attacks are sporadic and typically occur in short bursts. Therefore, if there is a history of regularly occurring traffic from a sender and the packet headers from current traffic are consistent with headers of past traffic, then the likelihood of an attack signature is reduced, whereas if the headers of current traffic from a sender differ from headers of past traffic, then likelihood of an attack signature increases. In some such embodiments, the detecting node stores or indexes the header properties for packets sampled over a period of time. For instance, the detecting node can index the number of packets sampled from different IP addresses or the different values for a particular header property sampled from packets sent by the same or different senders.

Figure 3:
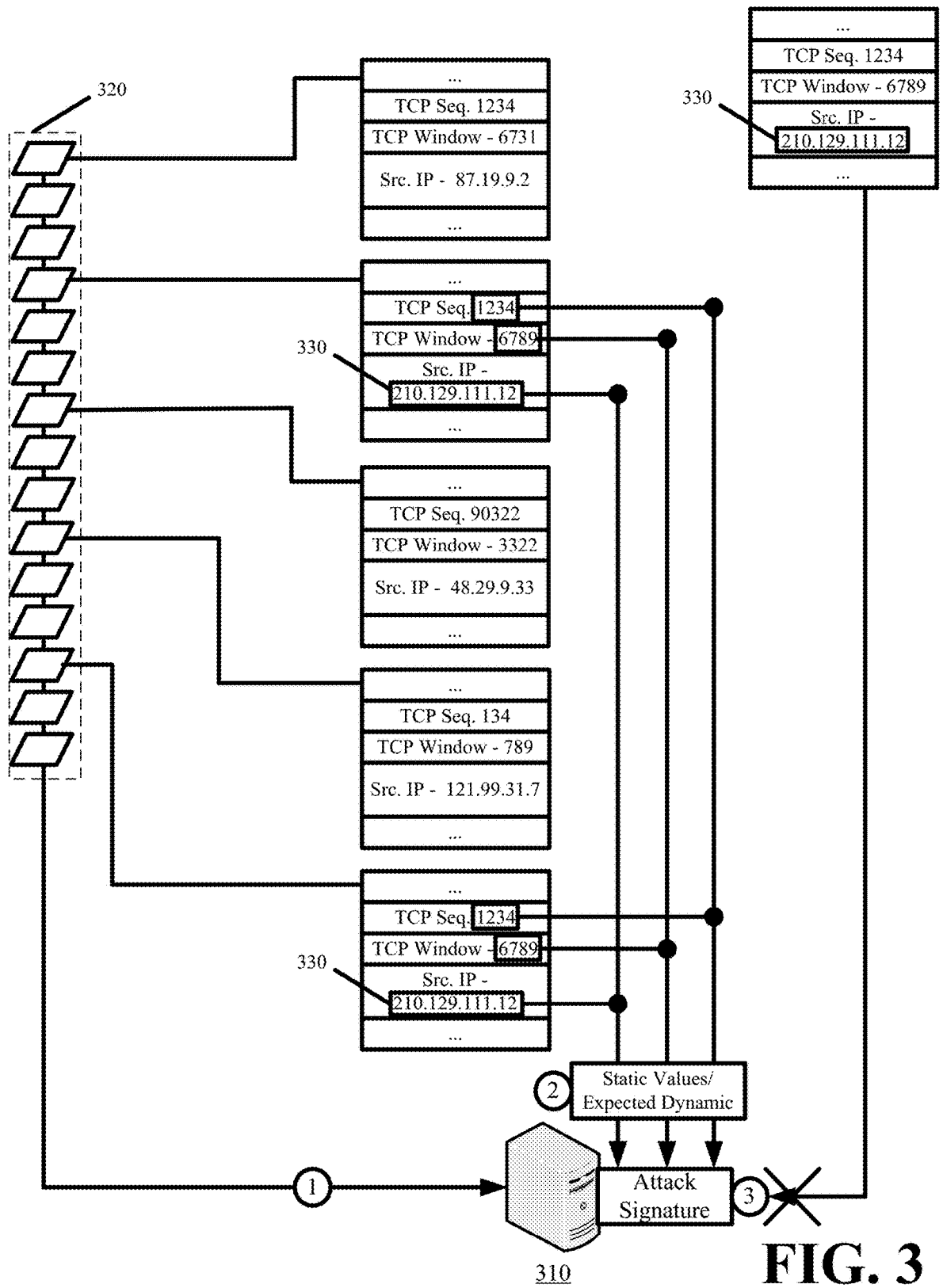
FIG. 3 illustrates localized attack detection of an attack signature based on a packet header property that is expected to change in different packets from the same sender, but that remains the same in the different packets from the sender.
Figure 4:
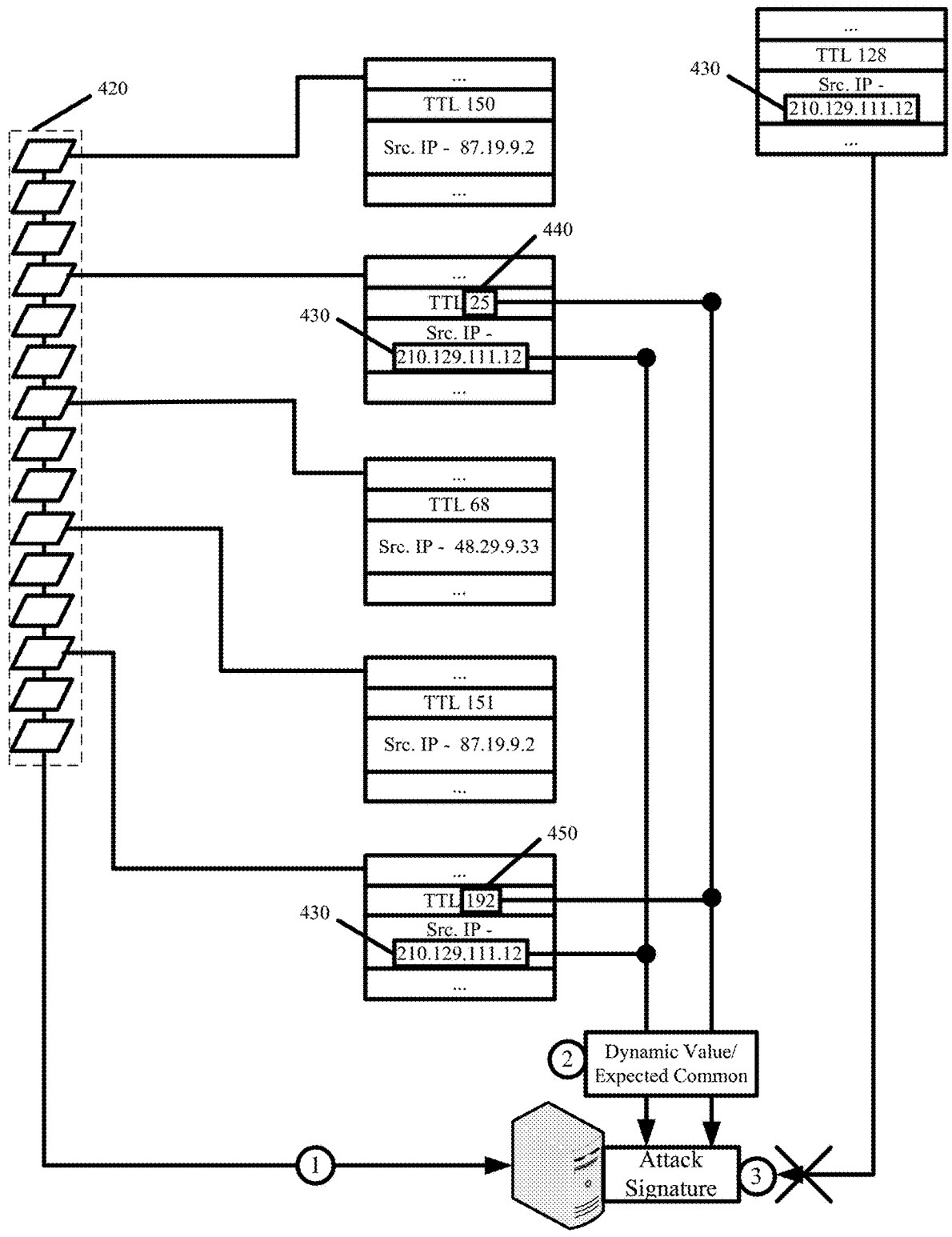
FIG. 4 illustrates localized attack detection of an attack signature based on a packet header property that is not expected to change in different packets from the same sender, but does changes in the different packets from that sender.
Figure 5:
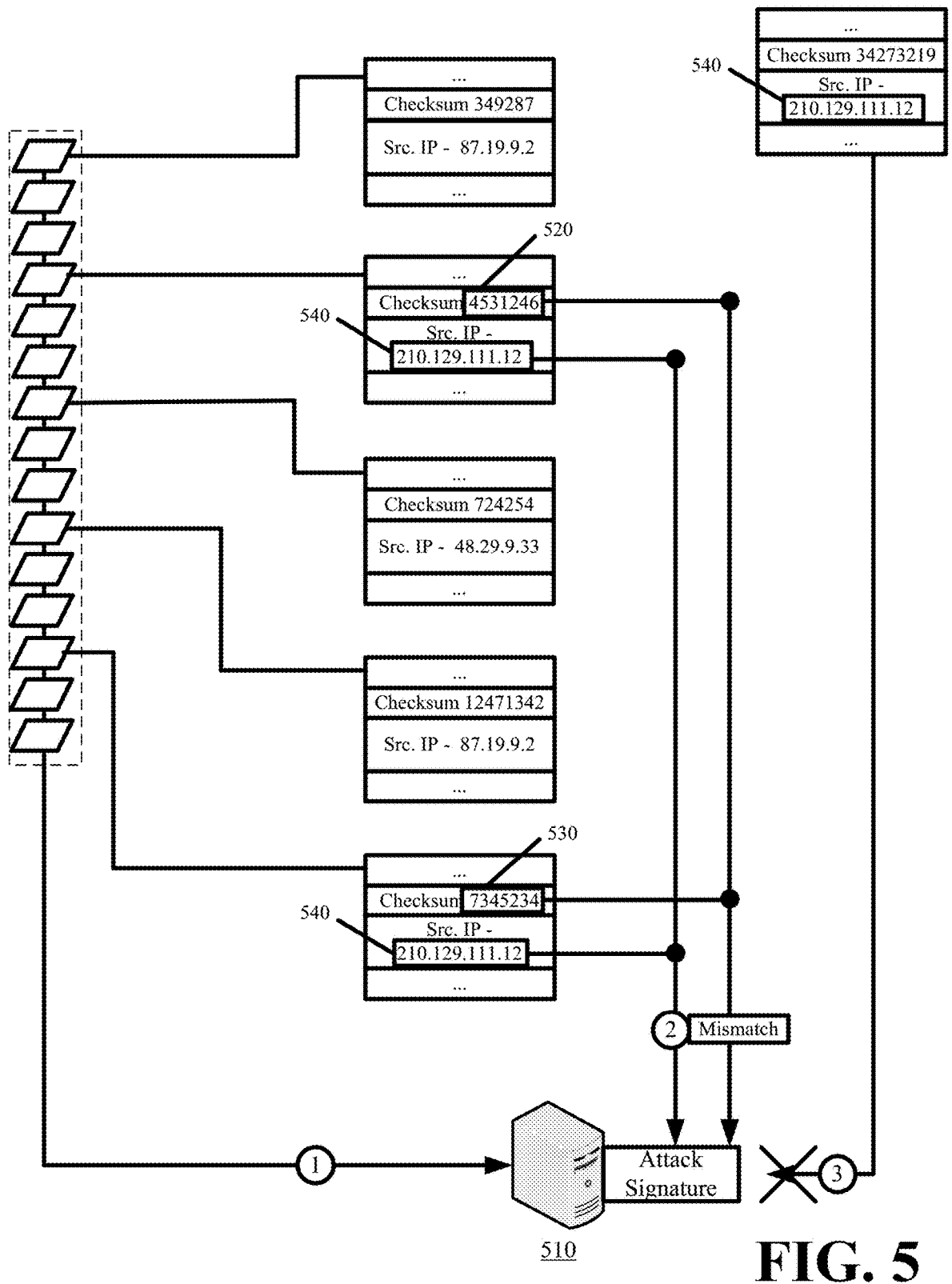
FIG. 5 illustrates localized attack detection identifying an attack signature based on one or more packet header properties having values outside an expected range of values.

FIGS. 3-5 illustrate attack signatures identified from localized attack detection in accordance with some embodiments. Similar attack signatures may be identified by the embodiments described further below for implementing global attack detection. These examples are not meant to be exhaustive or inclusive of all identifiable attack signatures.

FIG. 3 illustrates localized attack detection of an attack signature based on a packet header property that is expected to change in different packets from the same sender, but that remains the same in the different packets from the sender. In this figure, the node 310 receives different packets 320 from different senders. The node 310 samples every third packet from the received packets 320. The node 310 inspects the sampled packets and detects an attack signature based on the sequence number and window size in the TCP header of packets from a particular sender 330 being static when they should have some variation. The static values may be due to a botnet hardcoding the header properties such that all packets generated from different clients under botnet control have the same values for these properties. In response to the detected attack signature, the detecting node 310 creates a rule based on the identified attack signature and blocks or otherwise take actions against subsequently received packets from the particular sender and other senders having the same sequence number and window size or other repeating or static values for these properties.

FIG. 4 illustrates localized attack detection of an attack signature based on a packet header property that is not expected to change in different packets from the same sender, but does change in the different packets from that sender. The time-to-live (TTL) within the IP header is one such property that is not expected to change or change by small increments for packets from the same sender. The TTL is decremented for each hop the packet traverses in reaching the distributed platform node. Packets from the same sender typically traverse the same nodes and therefore should have the same TTL. A botnet may randomize all header properties such that there is unexpected variation in the TTL, thereby providing indicia of an attack signature. In this figure, the node 410 receives packets 420 from different senders, samples a subset of the packets, and identifies two sampled packets from a particular sender 430 with large variation in the TTLs 440 and 450 of the packets. In response to the detected attack signature, the detecting node 410 creates a rule based on the identified attack signature and blocks or otherwise take actions against subsequently received packets from the particular sender 430.

FIG. 5 illustrates localized attack detection identifying an attack signature based on one or more packet header properties having values outside an expected range of values. The botnet may randomize values for the TCP sequence number, acknowledgement number, checksum, or window size such that they deviate from a corresponding property threshold value or from an earlier value, wherein the property threshold value can be an expected value, an incremented value, an average or mean set of values, a computed value, or a value derived according to a pattern or algorithm. In this figure, the detecting node 510 inspects the checksums 520 and 530 of received packets and determines that the checksum 520 and 530 entered in each packet from a particular sender 540 are always mismatched, wherein the mismatching is likely due to the botnet randomizing the checksum value for attack packets rather than properly computing the values. Accordingly, the detecting node 510 creates a rule based on this attack signature to block or otherwise take action against packets from that particular sender 540.

With reference back to FIG. 2, the process continues by providing (at 240) an attack signature score to each header property of a sampled packet. The scoring is based on the degree with which the value for the header property deviates from a corresponding property threshold value. The property threshold value varies based on the header property at issue and can be an expected value, a derived or computed value, a default value, a constant value, an average or mean set of values, or a randomized value. If the deviation from the property threshold value is great, a higher score is assigned to the header property to indicate a higher likelihood that the property is a signature of an attack or other anomalous event. In other words, the greater deviation indicates a greater likelihood that the packet originated from a botnet and not a legitimate user and is sent as part of an attack rather than a valid request or client-server exchange. Conversely, if the deviation is small, a lower score is assigned to the header property to indicate a lower likelihood that the property is not a signature of an attack.

In some embodiments, the scoring is biased based on different weighting of different header properties. Certain header properties may be more indicative of an attack or anomalous event and so the score for those header properties may be increased to reflect the greater significance of those header properties. Weights can also adjust scoring based on header property values for the identified attack signatures in previous packets from the same sender or other basis of commonality. For instance, if the sender has a regular history of sending packets with a deviating header property value, then the deviation may be the result of a misconfiguration or innocuous network condition. In this case, the deviation is less likely to be representative of an attack or anomalous event and the score for the corresponding attack signature can be lowered as a result. Conversely, if the sender has no regular history of sending packets, then a detected sudden traffic spike from the sender can be indicia of an attack or anomalous event. Such weighting is based on each node logging or indexing header properties from the sampled packet for comparison or analysis with later and/or earlier arriving packets. In some embodiments, the nodes log or index packet header properties over a recurring 24 hour period. Attack signature scoring can also produce a new score or weight existing scores based on a rate at which packets arrive from a sender as well as the number of redundant packets coming from the sender. In doing so, the localized attack detection is based on traffic content but also traffic patterns.

The process sums (at 250) the scores of a particular packet or packets from a particular sender over a specific interval. The score summation is used to reveal an active attack or anomalous event, and attack signatures for that attack or anomalous event. In some embodiments, the process sums the scores for all header properties of a packet. The resulting total score identifies the likelihood of the corresponding packet harboring an attack. More specifically, if the total score exceeds a scoring threshold then the corresponding packet is identified as an attack packet. The signature of an attack or anomalous event can also be determined from the scoring of the header properties. In some embodiments, individual header property scores that exceed one or more scoring thresholds identify the attack signature for an attack. In some other embodiments, when the total score resulting from two or more of the highest scored header properties of a packet exceed a score threshold, the particular combination of two or more properties identify the attack signature. Stated differently, the attack signature is determined from a set of packet header properties having the largest deviations from corresponding property threshold values. It is preferable to produce an attack signature from multiple header properties as this increases the specificity of differentiating attack packets from valid user packets. In other words, an attack signature that identifies presence of an active attack from two or more packet header properties reduces the likelihood of a false positive.

The process implements (at 260) an attack protection in response to the attack signature identified from the header property scoring. The attack protection is primarily defined based on the identified attack signature. More specifically, the attack protection is defined according to one or more header properties of the attack signature that, if matched to an incoming packet, would subject the packet to the attack protection. IP addressing, subnets, autonomous system (AS) numbering, protocols, header options, user agent, or some combination thereof could be used to further the attack protection definition by broadening or restricting the scope of the attack protection. The attack protection further sets the protection that the node performs in response to an identified attack packet.

Different attack protections can be implemented depending on the scoring. A higher score is indicative of an attack or anomalous event that is identified with greater specificity such that stronger protective actions can be taken with a broad inclusion of packets matching the corresponding attack signature. A lower score is indicative of an attack or anomalous event that is identified with lower specificity such that weaker protective actions should be taken with a more restrictive inclusion of packets matching the corresponding the attack signature. For example, a first attack protection involves sending a redirect Uniform Resource Locator (URL) in response to packets that match an attack signature with computed header property scores exceeding a first score threshold, and a second attack protection involves blocking or dropping all traffic that match the attack signature with greater computed header property scores exceeding a second score threshold. As another example, a first attack protection can be defined to block second and subsequent packets from any sender in which the value of a particular header property is a static value and the static value produces a first score, a different second attack protection can be defined to block second and subsequent packets from any sender having a specific static value set for the particular header property and the specific static value produces a second score, and a different third attack protection can be defined to block second and subsequent packets from a specific sender having the specific static value set for the particular header property and the specific static value from the specific sender produces a third score. In this example, the scope of the attack protections are set in conjunction with the perceived specificity of the attack signature as determined from the scoring.

In some embodiments, the scoring controls whether corresponding attack protections are automatically enabled or enabled after administrator review. Enabling after administrator review is desirable for attack signatures that have a low degree of specificity and could result in a large amount of legitimate traffic being blocked by the attack protection.

Figure 6:
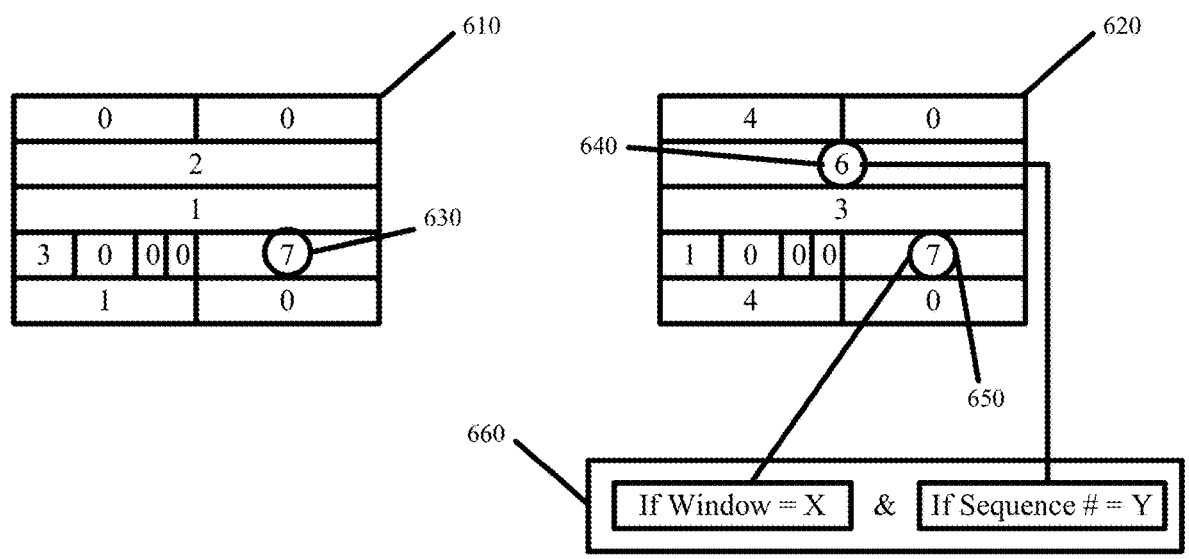
FIG. 6 conceptually illustrates attack signature identification from packet header property scoring in accordance with some embodiments.

FIG. 6 conceptually illustrates attack signature identification from packet header property scoring in accordance with some embodiments. The figure illustrates a first header 610 of a first packet and a second header 620 of a second packet. The figure further illustrates scores assigned to different properties of the packet headers 610 and 620.

The first packet header 610 has one header property 630 that is scored greater than a corresponding score threshold set for the header property 630. In this case, this single property 630 is insufficient to differentiate attack traffic from valid traffic with sufficient specificity. Accordingly, the first packet is determined to not be an attack packet.

The second packet header 620 has two header properties 640 and 650 that are scored greater than corresponding score thresholds set for the header properties 640 and 650. The corresponding two properties 640 and 650 provide sufficient specificity with which to differentiate the second packet as attack traffic and to define the signature 660 for the attack. Any subsequently received packets bearing the same signature 660 will be identified as attack traffic such that the receiving node implements attack protections against those packets.

The node performing the localized attack detection and mitigation process 200 can also distribute any implemented attack protections to other nodes in the same PoP or across the distributed platform so that the other nodes can preemptively take action should the attack spill over and spread across the distributed platform. In some embodiments, a broadcast message is used to spread the attack signature and corresponding attack protection from one node to other nodes of the distributed platform. In some other embodiments, the attack discovering node directly notifies other nodes of the attack signature and the corresponding attack protection using HTTP, HTTP Secure (HTTPS), or other network messaging.

Attack protections can be disabled or removed after a designated period of time or in response to attack traffic subsiding. In some embodiments, the node invoking the attack protection monitors the number of packets subsequently arriving packets with specific attack signatures that trigger specific attack protections over a period of time. The node then disables or removes the attack protections once the number of triggering packets over the monitoring interval is less than a threshold amount.

The localized attack detection and mitigation is advantageous because it allows each node to proactively protect itself from attack or anomalous events in near real-time based on the continual sampling of incoming traffic. However, some distributed attacks may be difficult to detect at the local node level and may require a larger sampling of traffic from across the distributed platform. Accordingly, some embodiments provide global attack detection and mitigation.

Figure 7:
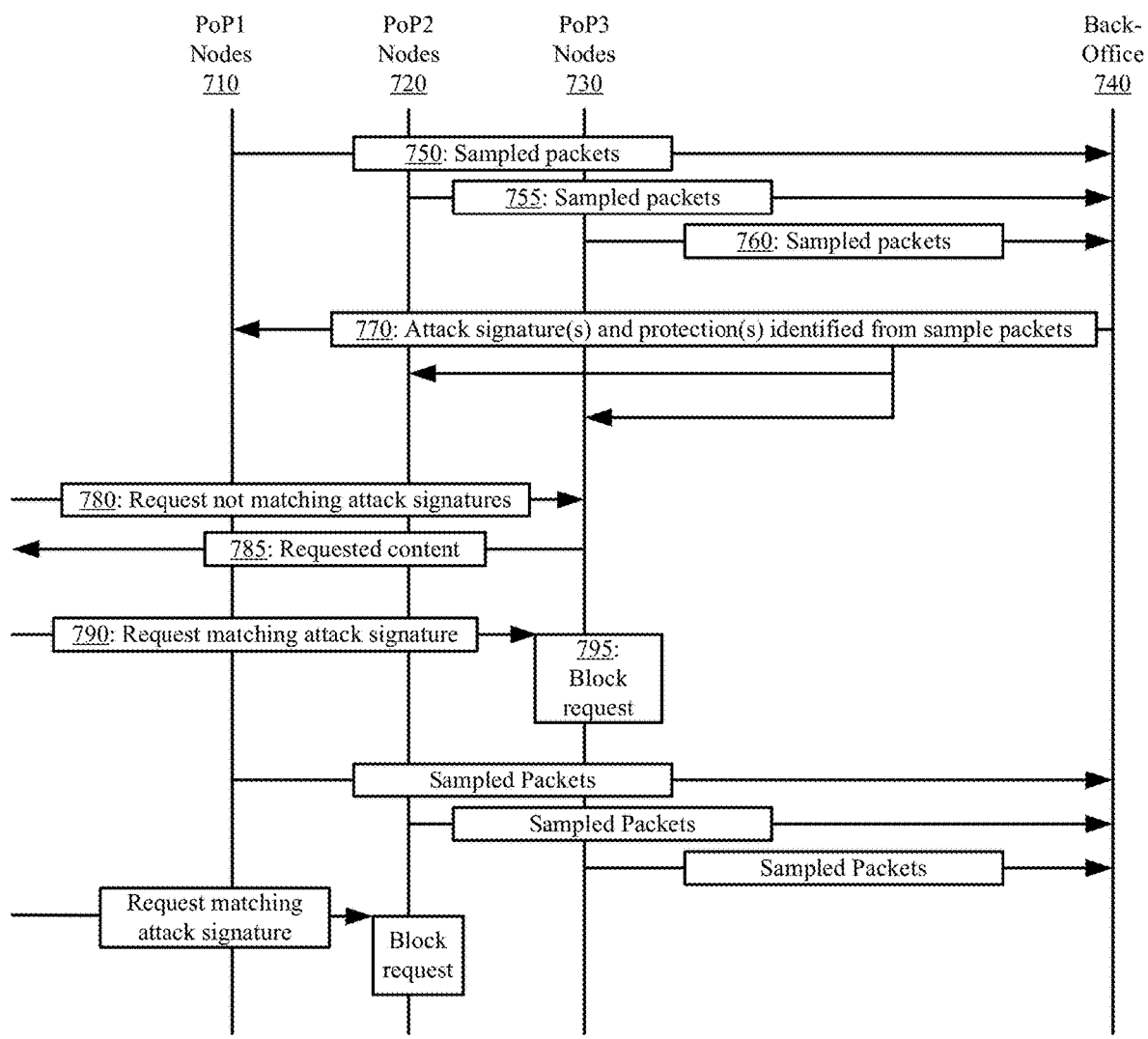
FIG. 7 conceptually illustrates global attack detection in accordance with some embodiments.

FIG. 7 conceptually illustrates global attack detection in accordance with some embodiments. The figure illustrates three PoPs 710, 720, and 730 representing different sets of nodes of a distributed platform, and a back-office 740 of the distributed platform. The distributed set of nodes can include the request directors, distribution servers, or traffic management servers from the different PoPs 710, 720, and 730 of the distributed platform.

The nodes from the PoPs 710, 720, and 730 regularly or periodically provide (at 750, 755, and 760) sampled traffic to the back-office 740. As with localized attack detection, the nodes sample some set of incoming traffic based on a desired sampling rate or filtering criteria. The nodes send the sampled traffic, and more specifically, sampled packet headers to the platform back-office 740. The nodes can send the sampled traffic as it is sampled. Alternatively, the nodes can batch two or more sampled packets to send at designated times or intervals in order to reduce the number of communications with the back-office 740. The nodes could also continue with their own analysis of the sampled traffic as per process 200 above for localized attack detection and mitigation.

The back-office 740 compiles the sampled set of traffic from PoPs 710, 720, and 730, thereby providing the back-office 740 with a holistic view of traffic across the distributed platform. Similar to steps 230-250 for localized attack detection, the platform back-office 740 inspects properties of the compiled set of sampled traffic, scores the property values, and sums the total scores. If the total score for a particular combination of properties exceeds a score threshold, the platform back-office 740 identifies an attack signature and configures the actions to take in response to packets bearing the attack signature. The back-office 740 is not however a point of attack protection enforcement, because the back-office 740 does not directly receive any traffic from senders. Accordingly, the back-office 740 sends (at 770) the attack signature and corresponding action back to the PoPs 710, 720, and 730 for detection and enforcement by the nodes.

The nodes at each of the PoPs 710, 720, 730 enforce the attack protections sent by the back-office at 740 against incoming packets with the corresponding attack signatures detected at the back-office. As shown, PoP 730 receives (at 780) a first request that does not harbor any configured attack signatures and the receiving PoP 730 node responds (at 785) with the requested content. However, a second request received (at 790) at PoP 730 does harbor one of the back-office identified attack signatures and the receiving PoP 730 node responds (at 795) by blocking or ignoring the second request.

The global attack protections are continually updated by the back-office 740 based on a continual sampling of packets from the different PoPs 710, 720, and 730. As noted above, the nodes in each of the PoPs 710, 720, and 730 can also perform their own independent localized attack detection and mitigation in conjunction with the global attack detection and mitigation performed by the back-office 740. In other words, the nodes in the PoPs 710, 720, and 730 locally inspect the sampled packets that are also sent to the back-office 740. In doing so, the nodes independently detect attack signatures and implement attack protections in addition to those provided by the back-office 740 in at least step 770.

Figure 8:
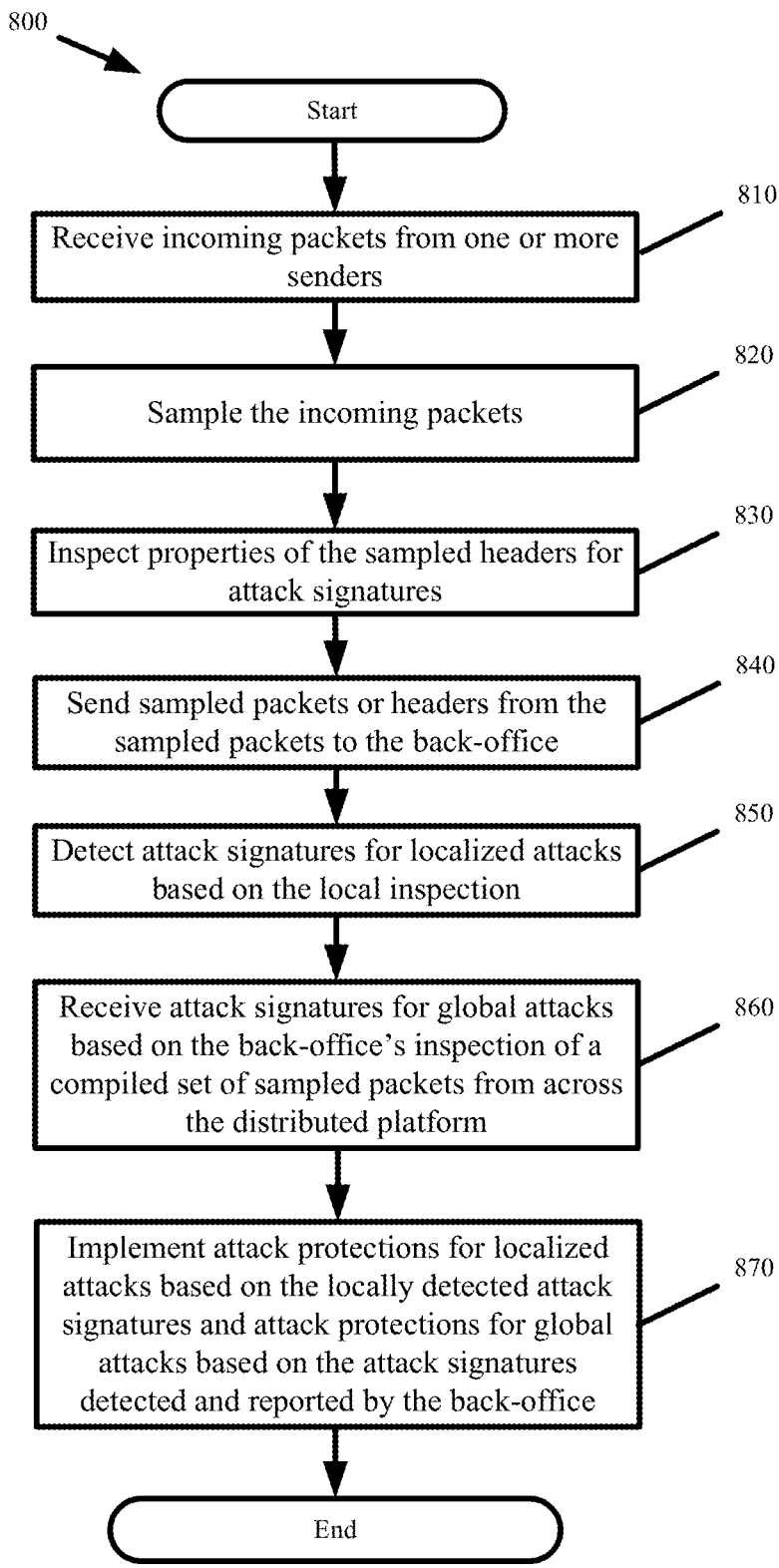
FIG. 8 provides a modified process for distributed platform nodes enforcing attack protections from locally detected attack signatures as well as attack signatures for global threats detected by the platform back-office.

FIG. 8 provides a modified process for distributed platform nodes enforcing attack protections from locally detected attack signatures as well as attack signatures for global threats detected by the platform back-office. As with process 200, process 800 commences with a distributed platform node receiving (at 810) incoming packets from one or more senders. The process again involves sampling (at 820) the incoming packets and locally inspecting (at 830) header properties of the sampled packets for attack signatures. Contemporaneous with the sampling or inspection, the process sends (at 840) a copy of the sampled packets or headers from the sampled packets to the back-office. The process detects (at 850) attack signatures for localized attacks based on the inspection at 830. The process also receives (at 860) attack signatures for global attacks based on the back-office's inspection of a compiled set of sampled packets from across the distributed platform, including the sampled packets sent at 840. As noted above, the back-office may also provide the corresponding attack protections that the distributed platform node is to enforce for incoming packets matching the back-office detected attack signatures. The process implements (at 870) attack protections for the localized attacks based on the locally detected attack signatures and attack protections for the global attacks based on the attack signatures detected and reported by the back-office.

Server, computer, and computing machine are meant in their broadest sense, and can include any electronic device with a processor including cellular telephones, smartphones, portable digital assistants, tablet devices, laptops, notebooks, and desktop computers. Examples of computer-readable media include, but are not limited to, CD-ROMs, flash drives, RAM chips, hard drives, EPROMs, etc.

Figure 9:
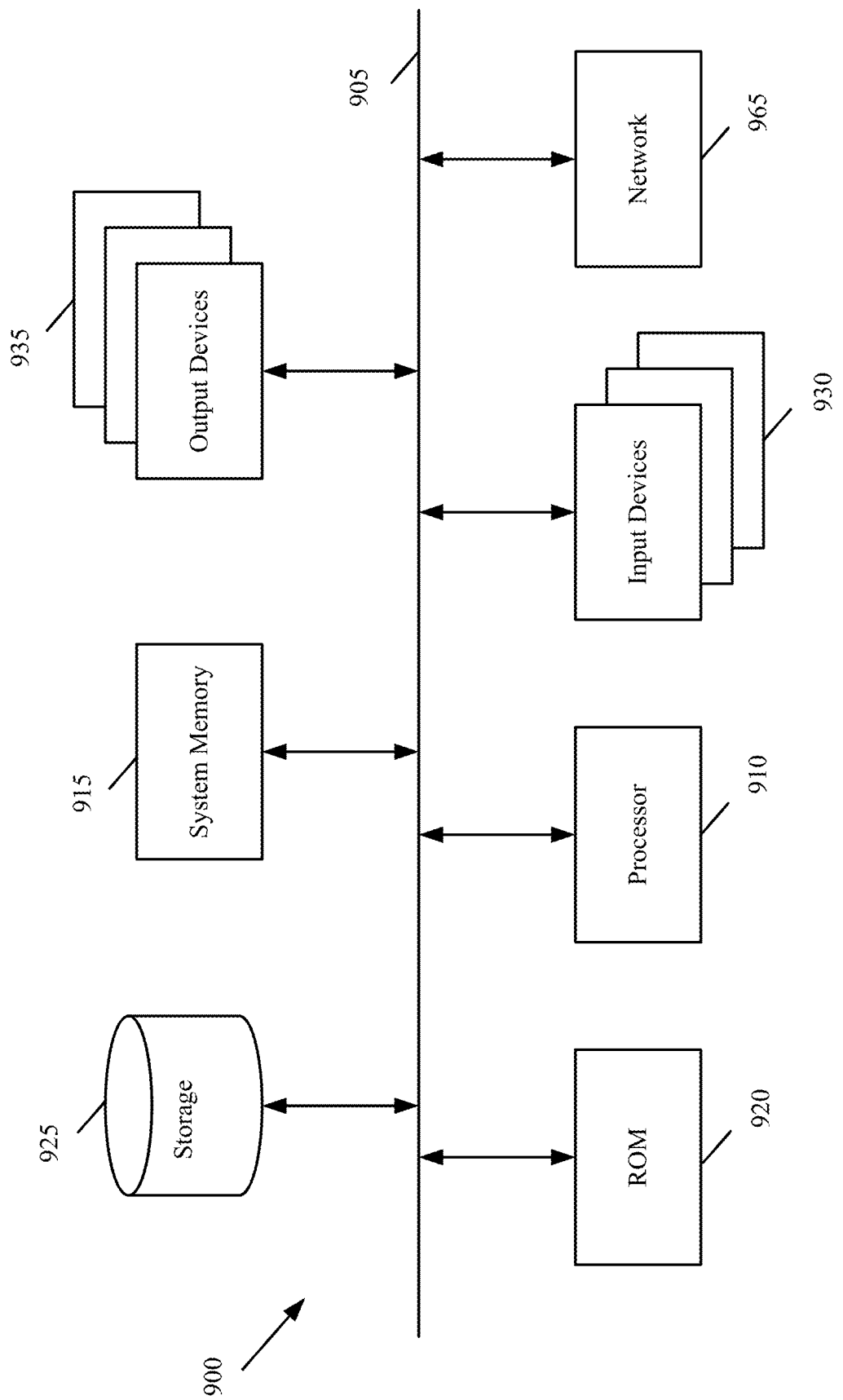
FIG. 9 illustrates a computer system or server with which some embodiments are implemented.

FIG. 9 illustrates a computer system or server with which some embodiments are implemented. Such a computer system includes various types of computer-readable mediums and interfaces for various other types of computer-readable mediums that implement the various methods and machines described above (e.g., request director, caching server, etc.). Computer system 900 includes a bus 905, a processor 910, a system memory 915, a read-only memory 920, a permanent storage device 925, input devices 930, and output devices 935.

The bus 905 collectively represents all system, peripheral, and chipset buses that communicatively connect the numerous internal devices of the computer system 900. For instance, the bus 905 communicatively connects the processor 910 with the read-only memory 920, the system memory 915, and the permanent storage device 925. From these various memory units, the processor 910 retrieves instructions to execute and data to process in order to execute the processes of the invention. The processor 910 is a processing device such as a central processing unit, integrated circuit, graphical processing unit, etc.

The read-only-memory (ROM) 920 stores static data and instructions that are needed by the processor 910 and other modules of the computer system. The permanent storage device 925, on the other hand, is a read-and-write memory device. This device is a non-volatile memory unit that stores instructions and data even when the computer system 900 is off. Some embodiments of the invention use a mass-storage device (such as a magnetic or optical disk and its corresponding disk drive) as the permanent storage device 925.

Other embodiments use a removable storage device (such as a flash drive) as the permanent storage device Like the permanent storage device 925, the system memory 915 is a read-and-write memory device. However, unlike storage device 925, the system memory is a volatile read-and-write memory, such as random access memory (RAM). The system memory stores some of the instructions and data that the processor needs at runtime. In some embodiments, the processes are stored in the system memory 915, the permanent storage device 925, and/or the read-only memory 920.

The bus 905 also connects to the input and output devices 930 and 935. The input devices enable the user to communicate information and select commands to the computer system. The input devices 930 include alphanumeric keypads (including physical keyboards and touchscreen keyboards), pointing devices. The input devices 930 also include audio input devices (e.g., microphones, MIDI musical instruments, etc.). The output devices 935 display images generated by the computer system. The output devices include printers and display devices, such as cathode ray tubes (CRT) or liquid crystal displays (LCD).

Finally, as shown in FIG. 9, bus 905 also couples computer 900 to a network 965 through a network adapter (not shown). In this manner, the computer can be a part of a network of computers (such as a local area network ("LAN"), a wide area network ("WAN"), or an Intranet, or a network of networks, such as the Internet).

As mentioned above, the computer system 900 may include one or more of a variety of different computer-readable media. Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, ZIP® disks, read-only and recordable blu-ray discs, any other optical or magnetic media, and floppy disks.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

We claim:

1. A method for automated network attack detection and mitigation, the method comprising:
    sampling a header from a plurality of packets that are provided by a particular sender or that are directed to common content, wherein each header comprises a plurality of properties;
    scoring a first property of the plurality of properties from the header of the plurality of packets based on the first property changing in each packet of the plurality of packets and an amount of deviation between a value set for the first property and an expected constant value;
    scoring a different second property of the plurality of properties from the header of the plurality of packets based the second property remaining constant in each packet of the plurality of packets;
    detecting an attack in response to a total score, resulting from said scoring of the first property and said scoring of the second property, exceeding a score threshold;
    defining an attack signature for the attack based on at least the first property and the second property of the header;
    implementing an attack protection against a subsequently arriving set of packets in response to detecting the attack signature in the header of the set of packets.

2. The method of claim 1 further comprising distributing the attack protection and the attack signature to a plurality of other servers operating in a same distributed platform, wherein the plurality of other servers implement said attack protection in response to said distributing.

3. The method of claim 1, wherein implementing the attack protection comprises dropping the set of packets.

4. The method of claim 1 further comprising forwarding the header of each packet from the plurality of packets to a different second server.

5. The method of claim 4 further comprising detecting a different second attack signature at the second server based on headers of the plurality of packets and headers of a second plurality of packets sampled and forwarded from a different third.

6. The method of claim 1 further comprising storing each header of the plurality of packets.

7. A method for protecting a plurality of nodes of a distributed platform from a network attack, the method comprising:
    receiving a plurality of packets at the plurality of nodes of the distributed platform;
    providing a sampling of the plurality of packets from the plurality of nodes to a back-office server of the distributed platform, wherein said sampling comprises a subset of the plurality of packets;
    scoring two or more header properties of the subset of packets based on an amount of deviation between a set value for each property and an expected value that is derived from a prior set value for each property in at least one prior packet originating from a common sender or one prior packet for common content, wherein said scoring comprises adjusting a score of a first property of the two or more header properties based on an amount of deviation between the set value of the first property and the expected value for the first property corresponding to a constant value;
    selecting an attack protection from at least a less restrictive first attack protection and a more restrictive second attack protection based on said scoring, wherein said selecting comprises selecting the first attack protection in response to a first value resulting from said scoring of the two or more header properties being less than a threshold, and selecting the second attack protection in response to a second value resulting from said scoring of the two or more header properties being greater than the threshold; and
    propagating the attack protection from the back-office server to the plurality of nodes.

8. The method of claim 7 further comprising implementing said attack protection at each node of the plurality of nodes in response to said propagating.

9. The method of claim 7 further comprising detecting an attack signature for the attack protection by identifying one or more properties from headers of the subset of packets with an anomalous value deviating from corresponding threshold values set for the one or more properties.

10. The method of claim 9, wherein said detecting further comprises defining the attack signature based on said one or more properties and said anomalous value.

11. The method of claim 9, wherein said detecting further comprises identifying a set of senders originating said one or more properties with the anomalous value, and defining the attack signature in protecting against packets from said set of senders.

12. The method of claim 10 further comprising detecting at a particular node of the plurality of nodes, an attack signature from inspecting headers of a particular set of the plurality of packets sampled by the particular node.

13. The method of claim 12 further comprising implementing at the particular node, the attack protection received from said propagating and a different second attack protection triggering in response to packets arriving at the particular node with headers matching the attack signature.

14. A method comprising:

receiving a plurality of packets sent by a plurality of clients to a particular server;

sampling the plurality of packets at the particular server, wherein said sampling comprises extracting at least two packets sent from a particular client of the plurality of clients;

computing a first score for a first header property of the at least two packets based on a difference between a value set for the first header property in the at least two packets and an expected constant value defined for the first header property;

computing a second score for a different second header property of the at least two packets based on a difference between a value set for the second header property in the at least two packets and an expected changing value defined for the second header property;

defining an attack signature based on the first header property and the second header property in response to detecting values deviating from one another instead of remaining the expected constant value in the first header property of the at least two packets, and in response to the first score and the second score, that are computed for the first header property and the second header property of the at least two packets from the particular client, exceeding a threshold; and invoking an attack protection at the particular server in response to receiving subsequent packets matching the attack signature, wherein said subsequent packets match the attack signature based on an anomalous value being set for one or more of the first header property and the second header property.

15. The method of claim 14, wherein said defining the attack signature is further in response to detecting a fixed static value instead of the expected changing value in the second header property of the at least two packets.

16. The method of claim 14, wherein said defining comprises comparing header properties of the at least two packets from the particular client.

\* \* \* \* \*